United States Patent
Sillanpää et al.

(10) Patent No.: US 10,139,313 B2
(45) Date of Patent: Nov. 27, 2018

(54) CAPACITIVE CYLINDER PRESSURE SENSOR

(71) Applicant: Teknologian tutkimuskeskus VTT Oy, Espoo (FI)

(72) Inventors: Teuvo Sillanpää, Espoo (FI); Panu Koppinen, Espoo (FI); Kai-Erik Elers, Espoo (FI)

(73) Assignee: TEKNOLOGIAN TUTKIMUSKESKUS VTT OY, Espoo (FI)

(*) Notice: Subject to any disclaimer, the term of this patent is extended or adjusted under 35 U.S.C. 154(b) by 30 days.

(21) Appl. No.: 14/805,478

(22) Filed: Jul. 22, 2015

(65) Prior Publication Data

US 2017/0023440 A1    Jan. 26, 2017

(51) Int. Cl.
| | |
|---|---|
| *G01M 15/08* | (2006.01) |
| *G01L 23/12* | (2006.01) |
| *G01L 9/00* | (2006.01) |
| *G01L 9/12* | (2006.01) |
| *F01L 19/00* | (2006.01) |

(52) U.S. Cl.
CPC ........... *G01M 15/08* (2013.01); *G01L 9/0005* (2013.01); *G01L 9/0033* (2013.01); *G01L 9/0072* (2013.01); *G01L 9/12* (2013.01); *G01L 23/12* (2013.01); *G01L 23/125* (2013.01); *F01L 19/00* (2013.01)

(58) Field of Classification Search
CPC ............................ G01M 15/08; G01L 9/0072
See application file for complete search history.

(56) References Cited

U.S. PATENT DOCUMENTS

| | | | |
|---|---|---|---|
| 4,382,377 A | 5/1983 | Kleinschmidt et al. | |
| 5,902,933 A * | 5/1999 | Bingo | G01L 9/125 361/283.4 |
| 2004/0261502 A1* | 12/2004 | Watarai | F02B 77/08 73/35.13 |
| 2012/0096944 A1* | 4/2012 | Leclerc | G01L 9/0072 73/718 |

FOREIGN PATENT DOCUMENTS

| | | | |
|---|---|---|---|
| DE | 102012112920 A1 | 6/2014 | |
| DE | 102012112920 * | 7/2014 | ............... G01L 9/12 |
| JP | H10-111206 A | 4/1998 | |

OTHER PUBLICATIONS

Oct. 14, 2016 Search Report issued in International Patent Application No. PCT/EP2016/067161.
Oct. 14, 2016 Written Opinion issued in International Patent Application No. PCT/EP2016/067161.

* cited by examiner

*Primary Examiner* — Manish S Shah
*Assistant Examiner* — Timothy Graves
(74) *Attorney, Agent, or Firm* — Oliff PLC

(57) ABSTRACT

A capacitive pressure sensor for an internal combustion engine is provided having a housing having a bottom surface, variable capacitor and circuitry. The variable capacitor is formed by a stationary electrode and an elastically bendable electrode. Pressure exerted on the bottom surface acts to bend the elastically bendable electrode. This bending alters the capacitance of the variable capacitor. The circuitry is configured to generate a signal based on the variable capacitance of the variable capacitor. This capacitance is representative of the pressure exerted on the bottom surface.

15 Claims, 5 Drawing Sheets

CAPACITIVE CYLINDER PRESSURE SENSOR

FIELD

Cylinder pressure sensors are used to improve the efficiency and emissions in combustion engines. Such sensors are currently used in large diesel combustion engines in a variety of applications including marine engines. However, there are a wide variety of applications for cylinder pressure sensors and they may be deployed in a wide variety of combustion engines and other cylinder based applications such as air compressors and hydraulic systems.

BACKGROUND

Cylinder pressure is an important control parameter for closed loop control of combustion engines. Existing cylinder pressure sensors, typically based on either piezoelectric or piezoresistive measurement, suffer from poor reliability and longevity. In many cases the operational life time of existing cylinder pressure sensors is a tenth of the expected time between major engine overhaul. The poor reliability and longevity of current sensors causes drastic increases in maintenance costs and increases out of service times for engines. As an example, existing cylinder pressure sensors have a typical lifetime of about 2000 hours and the target for marine applications of such sensors is 16000 hours.

Typically cylinder pressure sensors of the piezoresistive varieties include a strain gauge which is attached to a bending membrane. The bending membrane bends the gauge and the electrical resistivity of the sensor gauge changes. This change in the electrical resistivity can be measured. Piezoelectrical sensors include a piezoelectrical ceramic which is compressed with pretension in between a moving membrane and a rigid support. Applying pressure to the membrane causes an electrical charge which can be measured.

Typically, in existing sensor designs, the measuring element is in direct contact with a hot deflecting membrane. This causes high mechanical and thermal stresses to the measuring element. Therefore there is a need for thermal insulation between the sensing element and the membrane. Such implementations are difficult and often lead to difficult mechanical solutions. In the presented solution these problems are solved and a simple and reliable pressure sensor can be implemented.

SUMMARY OF THE INVENTION

An object of certain embodiments of the present invention is to provide a simple and reliable capacitive pressure sensor. Through such embodiments, a simple, robust and reliable capacitive cylinder pressure sensor can be realized.

Certain embodiments of the present invention provide for a capacitive pressure sensor which may be employed in combustion engines. Such capacitive pressure sensors provide for measurement of cylinder pressure within the combustion engine.

The high temperature and repeated stress provided by the cylinder of an internal combustion engine provide a challenging employment of pressure sensors. Some embodiments of the present invention allow for measurement of these challenging environments by insulating certain components of the pressure sensor from the high heat and pressure environment of the cylinder.

Some embodiments of the present invention are comprised of a housing, variable capacitor and circuitry. The housing is formed of a steel cylinder having a bottom surface and an outer surface. The outer surface is threaded to allow for installation to the cylinder head of a combustion engine. The variable capacitor is formed by a stationary electrode and an elastically bendable electrode. Pressure exerted on the bottom surface acts to bend the elastically bendable electrode. This bending alters the capacitance of the variable capacitor. The circuitry is configured to generate a signal based on the variable capacitance of the variable capacitor. This capacitance is representative of the pressure exerted on the bottom surface. As such there is no need for mechanical contact to a hot membrane and certain problems of the existing solutions are avoided.

Some embodiments of the present invention employ ceramics such as Low Temperature Co-fired Ceramics (LTCC). These ceramics may serve to form a structure internal to the housing of the sensor.

According to a first aspect of the present invention, there is provided a capacitive pressure sensor mountable to the cylinder head of combustion engine. The housing 10 having a bottom surface 12 and a variable capacitor 20. The variable capacitor 20 is formed by a stationary electrode 22 and an elastically bendable electrode 24. The stationary electrode 22 being disposed within the housing 10 and the elastically bendable electrode 24 being arranged between the stationary electrode 22 and the bottom surface 12. The sensor also has circuitry 30 configured to generate a signal based on the pressure dependent capacitance of the variable capacitor 20, the signal being representative of a pressure exerted on the bottom surface 12.

Various embodiments of the first aspect may comprise at least one feature from the following bulleted list:
- the elastically bendable electrode forms at least a portion of the bottom surface
- the stationary electrode is substantially parallel to the elastically bendable electrode
- the bottom surface is configured to be exposed to the cylinder of the combustion engine
- the elastically bendable electrode is configured to be exposed to the cylinder of the combustion engine
- the capacitive pressure sensor further comprising a thermal insulating component disposed at least partially between the bottom surface and the circuitry
- the elastically bendable electrode is elastically bendable at pressures exerted on the bottom surface below 20 bar, 50 bar, 80 bar, 100 bar, 200 bar, 300 bar, or 400 bar
- the thermal conductivity between the bottom surface and the circuitry is less than 3.5 (W/(m*K))
- the stationary electrode is comprised of ceramic such as Low Temperature Co-fired Ceramic (LTCC)
- the capacitive pressure sensor further comprising a first conductive structure electrically connected to the stationary electrode and a second conductive structure electrically connected to the elastically bendable electrode According to second aspect of the present invention, there is provided a method of installation of a capacitive pressure sensor to a cylinder head of an internal combustion engine.

According to third aspect of the present invention, there is provided a combustion engine comprising a cylinder head having a capacitive pressure sensor.

According to a fourth aspect of the present invention, there is provided a cylinder head for combustion engine comprising a capacitive pressure sensor of any of claim 1-10.

According to a fifth aspect of the present invention, there is provided a capacitive pressure sensor apparatus mountable to the cylinder head of an internal combustion engine for measuring pressure in a cylinder of the engine, the sensor apparatus comprising a cylindrical housing having a side wall, a stationary electrode disposed within the housing, and a movable electrode exposed and responsive to pressure changes in the cylinder, said electrodes forming a capacitor having a capacitance varying according to said pressure changes, a circuitry disposed in the housing for generating a signal representing said varying capacitance, wherein the stationary electrode is disposed substantially perpendicularly relative to the side wall of the housing, and the movable electrode forms at least a part of the bottom wall of the housing.

The invention is defined by the features of the independent claims. Some specific embodiments are defined in the dependent claims.

EMBODIMENTS

In certain embodiments of the present invention, a housing of the sensor is defined by a bottom surface, side surface and top surface (not shown). The housing may be cylindrical with circular top and bottom surfaces. In such instances, the side surface would be the surface along the perimeter of the cylinder.

According to some embodiments of the present invention a capacitive pressure sensor is provide as comprising a housing having a bottom surface, variable capacitor and circuitry. The variable capacitor is formed by a stationary electrode and an elastically bendable electrode. Pressure exerted on the bottom surface acts to bend the elastically bendable electrode. This bending alters the capacitance of the variable capacitor. The circuitry is configured to generate a signal based on the variable capacitance of the variable capacitor. This capacitance is representative of the pressure exerted on the bottom surface.

Figure 1:
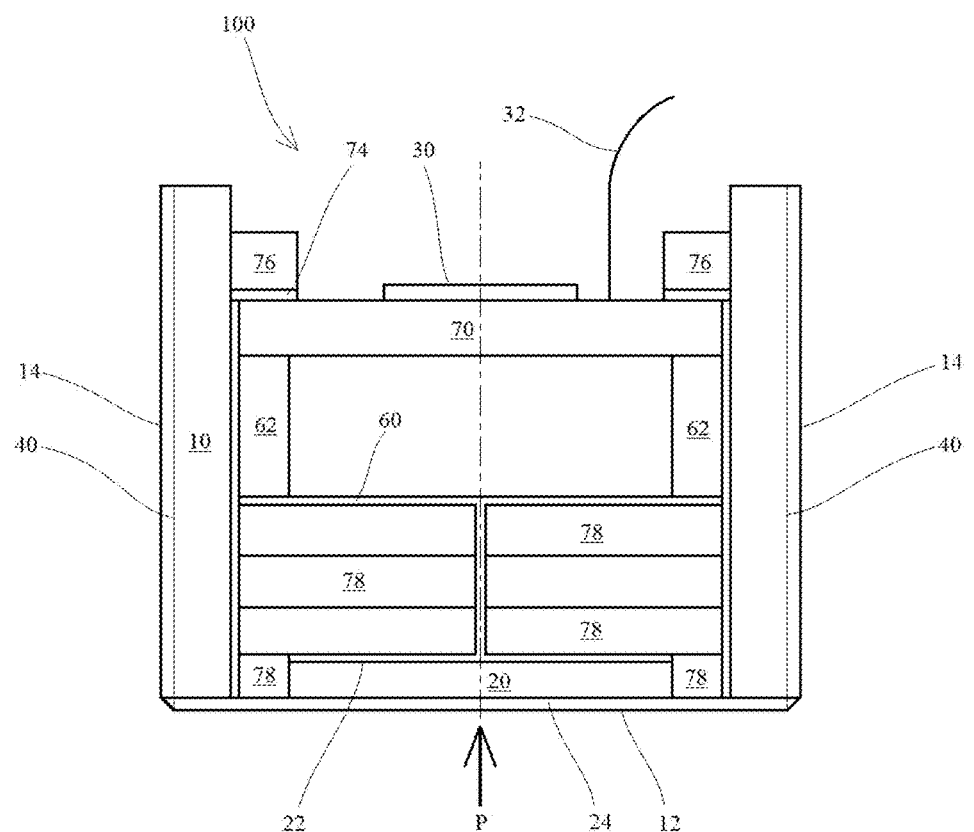
FIG. 1 illustrates schematic view of a capacitive pressure sensor in accordance with at least some embodiments having a cylindrical housing and comprising a variable capacitor formed by a stationary electrode and an elastically bendable electrode.

FIG. 1 illustrates a schematic view of a capacitive pressure sensor 100 in accordance with at least some embodiments of the present invention. The capacitive pressure sensor 100 is mountable to the cylinder head of a combustion engine. The capacitive pressure sensor comprises a housing 10, variable capacitor 20 and circuitry 30. The housing has a bottom surface 12. The variable capacitor 20 is formed by a stationary electrode 22 and an elastically bendable electrode 24. The stationary electrode 22 being disposed within the housing 10 and the elastically bendable electrode 24 being arranged between the stationary electrode 22 and the bottom surface 12. The sensor also has circuitry 30 configured to generate a signal based on the variable capacitance of the variable capacitor 20, the signal being representative of a pressure exerted on the bottom surface 12.

As shown in FIG. 1, in some embodiments of the present invention the elastically bendable electrode 24 forms at least a portion of the bottom surface 12.

In certain embodiments of the present invention an outer surface 14 of the housing 10 is cylindrical. The housing may form a cylinder. In such embodiments the bottom of the cylinder is dimensioned such that it deflects as a function of pressure.

In certain embodiments the internal structure may be formed by ceramics, for example, Low Temperature Co-Fired Ceramics. In such instances LTCC layers form the internal structure. This structure can provide for a gap between the stationary electrode 22 and the elastically bendable electrode 24 which form the variable capacitor 20. The internal structure may also function as a heat insulator between the bottom surface 12 and the remaining components.

As illustrated in FIG. 1, in certain embodiments, the internal structure is mechanical compressed within the housing 10. This may be accomplished by a mechanical clamping structure. The mechanical clamping structure can consist of a compressing nut 76, PCB 70 and first conductive structures 62. The compressing nut may be separated from the mechanical clamping structure by springs 74. In such instances the springs 74 ensure the proper clamping force.

Also illustrated within FIG. 1 are electrical contacts 60 and first conductive structures 62. The conductive structures electrically connect the stationary electrode 22 to the printed circuit board (PCB) 70. Affixed to the printed circuit board is the circuitry 30. The circuitry 30 is electrically connected to the first conductive structures 62 through the PCB 70.

As further illustrated by FIG. 1, in certain embodiments the stationary electrode is comprised of ceramic such as LTCC. This may be formed in a layered fashion.

Also illustrated in FIG. 1 is a wire 32 for transmitting of the signal generated by the circuitry. This wire 32 may transmit the signal to an engine control unit for close control of an engine to which the sensor is equipped.

In certain embodiments of the capacitive pressure sensor further comprises threads 40 disposed on at least a portion of the outer surface 14 of the housing 10.

In some embodiments of the present invention, the housing 10 has a threaded 40 outer surface 14.

In some embodiments of the capacitive pressure sensor the elastically bendable electrode 24 is arranged to elastically bend responsive to the pressure exerted on the bottom surface 12.

In certain embodiments of the present invention the measurement resolution of the capacitive pressure sensor can be estimated with the aid of the following equations: $\Delta P_{min} = (d/\beta)*(\Delta V/V)$, where $\beta = (\Delta d)/\Delta P$. Within the equations $\Delta P_{min}$ refers to the measurement resolution, d is the distance between the stationary electrode 22 and elastically bendable electrode 24 and $\Delta d$ is the displacement of elastically bendable electrode, $\Delta P$ is a pressure change, $\Delta V$ is representative of electronics noise and V is the applied measurement voltage. As an example of estimation as per the supplied equations, if the mechanical sensitivity is β=7 n/bar, electrode gap is d=50 μm, electronics noise is ΔV=3 nV/√Hz and measurement voltage is V=3V the resolution of the 10 kHz band is ≈1 mbar. For example, the required measurement resolution for diesel engine having a capacity greater than 1 MW is 10 bar@10 kHz BW.

In certain embodiments the stationary electrode 22 is disposed substantially perpendicular relative to the outer surface 14 of the housing 10.

In some embodiments of the present invention, the bottom surface 12 is configured to be exposed to the cylinder of the combustion engine.

In certain embodiments of the present invention the elastically bendable electrode 24 is configured to be exposed to the cylinder of the combustion engine.

Figure 2:
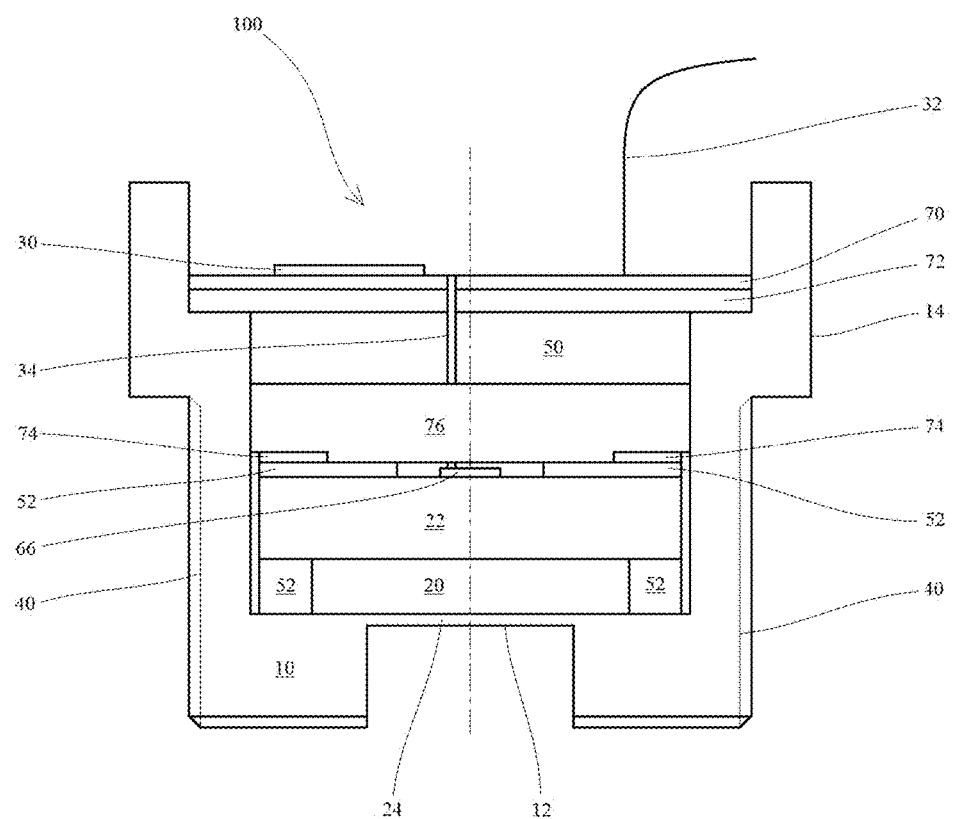
FIG. 2 illustrates a schematic view of a capacitive pressure sensor in accordance with at least some embodiments of the present invention wherein the elastically bendable electrode forms a portion of the housing.

FIG. 2 illustrates a schematic view of a capacitive pressure sensor 100 according to certain embodiments of the present invention wherein a compressing nut 76 provides a mechanical clamping force. The clamping force affixes the stationary electrode 22 to the housing 10. Insulators 52 are positioned at least partially between the stationary electrode 22 and the housing 10. The insulators may be ceramic. The insulators may also be MICA. The insulators electrically insulate the stationary electrode 22 from the housing 10.

Some embodiment may comprise springs 74 disposed at least partially between the compressing nut 76 and stationary electrode 22. The stationary electrode 22 is electrically insulated from the springs 74 by further insulators 52.

A thermal insulating component 50 may be disposed between the compressing nut 76 and support plate 72.

Figure 3:
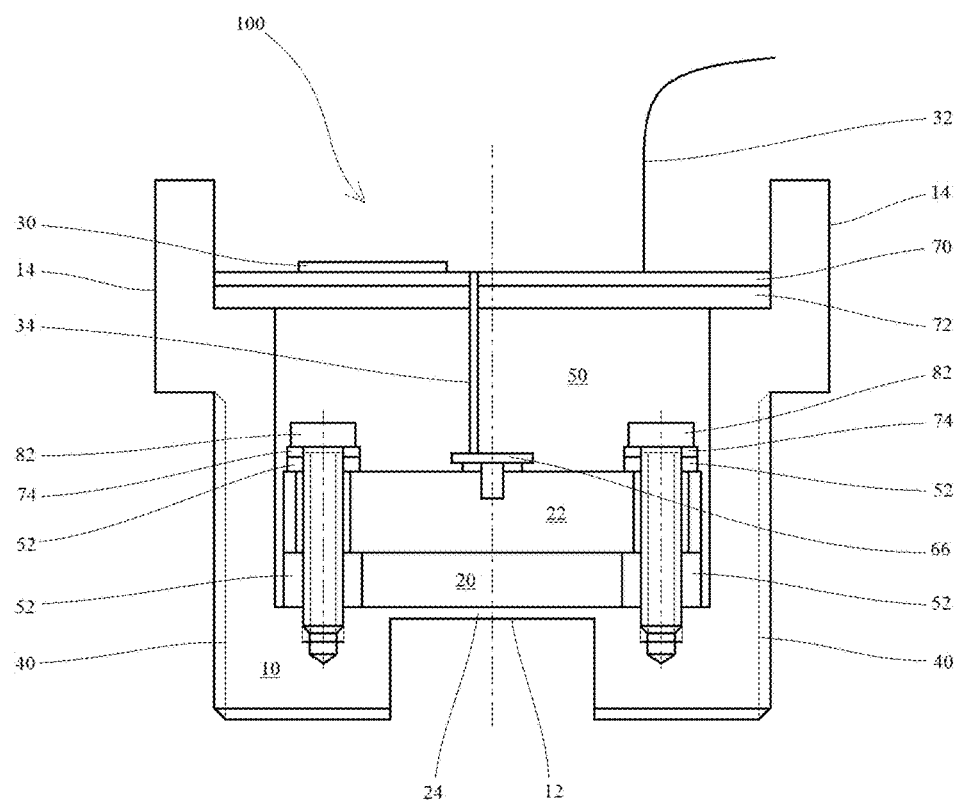
FIG. 3 illustrates a schematic view of a capacitive pressure sensor in accordance with at least some embodiments of the present invention wherein the stationary electrode is made of steel and insulated with ceramic insulators.

FIG. 3 illustrates a schematic view of a capacitive pressure sensor 100 according to certain embodiments of the present invention. The stationary electrode 22 is comprised of steel and insulated with insulators 52. The insulators may be ceramic. The insulators may also be MICA. The insulators electrically insulate the stationary electrode 22 from the housing 10. The stationary electrode 22 is fastened to the housing via tightening bolts or screws 82. The tightening bolts or screws 82 are also insulated from the stationary electrode 22 by the insulators 52. Springs 74 may be disposed between the stationary electrode 22 and the tightening bolts or screws 82.

A thermal insulating component is disposed between the stationary electrode 22 and a support plate 72. The PCB 70 is supported at least partially by the support plate 72. Affixed to the PCB is circuitry 30 configured to generate a signal based on the variable capacitance of the variable capacitor 20. A wire 32 is electrically connected to the PCB 70 and may be connected to another component.

A coaxial wire 34 for electrically connecting the stationary electrode 22 with the circuitry 30. The coaxial wire 34 is connected to the stationary electrode 22 via a clamped contact 66. The coaxial wire 34 or corresponding connecting electrode and clamped contact 66 may be an integrated part of the stationary electrode 22.

The variable capacitor 20 is formed by the stationary electrode 22 and the elastically bendable electrode 24 which forms a portion of the housing 10.

As illustrated by FIG. 3, in certain embodiments of the present invention a thermal insulating component 50 is disposed at least partially between the bottom surface 12 and the circuitry 30. This thermal insulating component may be, for example, stone wool.

According to certain embodiments of the present invention the capacitive pressure sensor is mountable to the cylinder head of an internal combustion engine.

Figure 4:
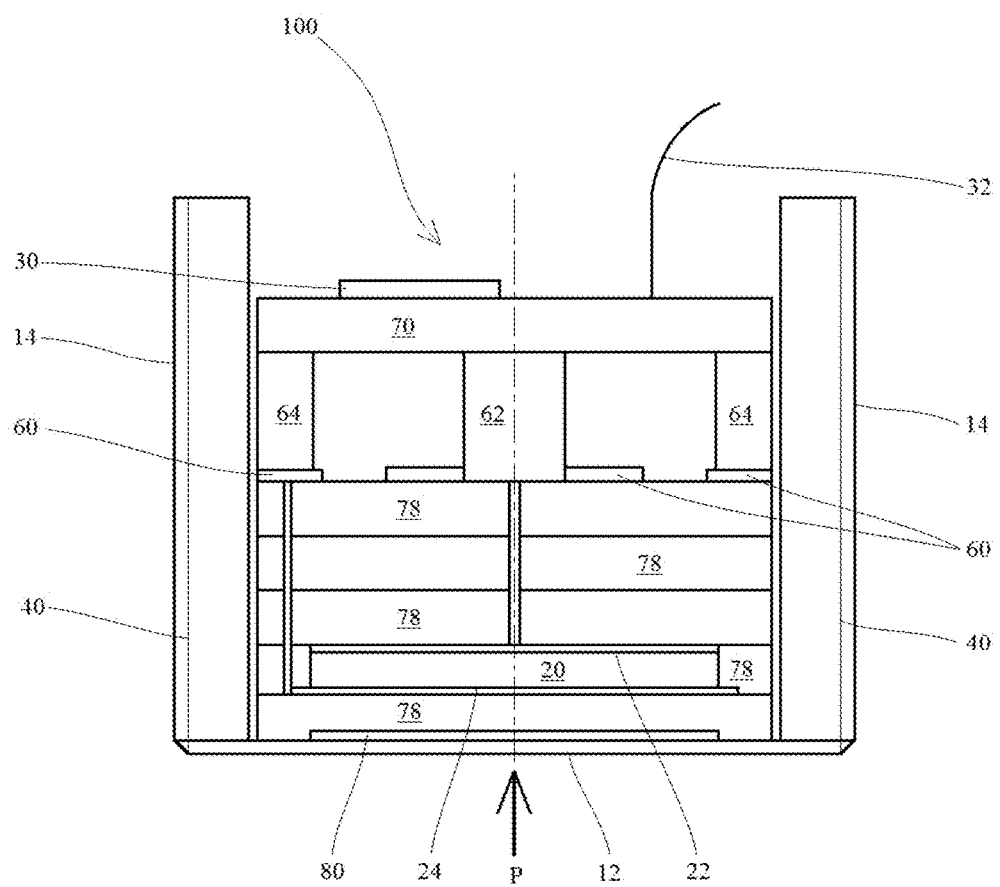
FIG. 4 illustrates a schematic view of a capacitive pressure sensor in accordance with at least some embodiments of the present invention wherein both the stationary electrode and the elastically bendable electrode are formed by Low Temperature Co-fired Ceramics (LTCC)

FIG. 4 shows a schematic view of a capacitive pressure sensor according to certain embodiments of the present invention. In the illustrated embodiment the internal structure of the sensor is adhered to the housing via an adhesive 80. This adhesive may be applied to the housing such that it is between the bottom surface 12 and the internal structure. In such applications a high temperature glue is used, for example a ceramic adhesive.

When the portion of the housing forming the bottom surface 12 elastically bends, it causes the elastically bendable electrode to bend and the variable capacity of the variable capacitor to change.

As also shown in FIG. 4, the elastically bendable electrode 24 may be comprised of ceramic such as LTCC.

As shown in FIG. 4, in certain embodiments of the present invention there are first conductive structures 62 electrically connected to the stationary electrode 22 and a second conductive structure 64 electrically connected to the elastically bendable electrode 24. These structures electrically connect the electrodes to the PCB 70 and circuitry 30.

In some embodiments of the present invention a thermal insulating component 50 is disposed at least partially between the bottom surface 12 and the elastically bendable electrode 24.

Also shown in FIG. 4 are structural material layers 78. These layers may also be comprised of a ceramic such as LTCC.

Figure 5:
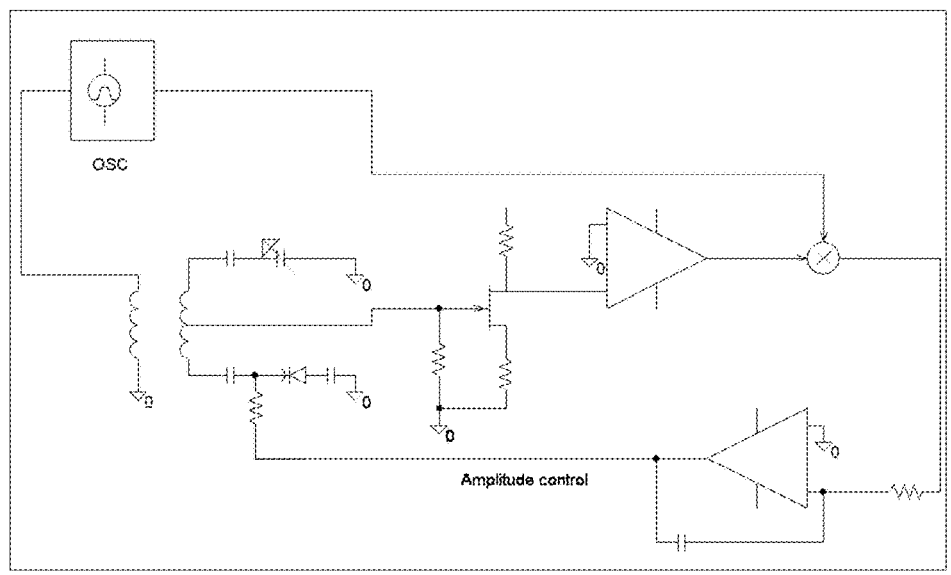
FIG. 5 illustrates a capacitance readout solution according with at least some embodiments of the present invention.

FIG. 5 illustrates a capacitance readout solution according to certain embodiments of the present invention.

In certain embodiment of the present invention electrical conducting components are integrated within ceramic, for example, LTCC.

In some embodiments of the present invention, the elastically bendable components are elastically bendable when exposed to pressures seen within the combustion chamber of combustion engine. In some instances the elastically bendable electrode 24 is elastically bendable at pressures exerted on the bottom surface 12 below 20 bar, 50 bar, 80 bar, 100 bar, 200 bar, 300 bar, or 400 bar.

In certain embodiments of the present invention the circuitry 30 is thermally isolated from the bottom surface 12. The thermal conductivity between the bottom surface 12 and the circuitry 30 may be, for example, less than 3.5 (W/(m*K)).

In some embodiments of the present invention the bottom surface 12 of the housing 10 is elastically bendable. In such instances the components between the bottom surface 12 and the elastically bendable electrode 24 also elastically bendable.

A method of installation of the capacitive pressure sensor according to an embodiment of the present invention comprises the steps of affixing the capacitive pressure sensor to a cylinder head of combustion engine.

An internal combustion engine according to some embodiments of the present invention comprises a cylinder head having the capacitive pressure sensor according to an embodiment of the present invention affixed to said cylinder head.

A cylinder head for a combustion engine according to some embodiments of the present invention comprises the capacitive pressure sensor according to an embodiment of the present invention affixed to said cylinder head.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in control systems of combustion engines. Some embodiments comprise pressure sensor applications in other harsh environment at high temperature and/or at high pressure such as air compressors and hydraulic systems.

REFERENCE SIGNS LIST

| | |
|---|---|
| 10 | Housing |
| 12 | Bottom Surface |
| 14 | Outer Surface |
| 20 | Variable Capacitor |
| 22 | Stationary Electrode |
| 24 | Elastically Bendable Electrode |
| 30 | Circuitry |
| 32 | Wire |
| 34 | Coaxial Wire |
| 40 | Threads |
| 50 | Thermal Insulating Component |
| 52 | Insulator |
| 60 | Electrical Contacts |
| 62 | First Conductive Structure |
| 64 | Second Conductive Structure |
| 66 | Clamped Contact |
| 70 | Printed Circuit Board (PCB) |
| 72 | Support Plate |
| 74 | Spring |
| 76 | Compressing Nut |
| 78 | Structural Material Layer |
| 80 | Adhesive |
| 82 | Tightening Screw |
| 100 | Pressure Sensor |
| P | Pressure |

The invention claimed is:

1. A capacitive cylinder pressure sensor comprising:
a cylindrical housing made of steel including: (i) a threaded outer surface configured to mount the capacitive cylinder pressure sensor to a cylinder head of an internal combustion engine to measure a pressure in a cylinder of the internal combustion engine, and (ii) a bottom surface positioned in a pressurized and hot environment within the cylinder of the internal combustion engine, when the cylindrical housing is mounted to the cylinder head of internal combustion engine;
a variable capacitor having a stationary electrode and an elastically bendable electrode, the stationary electrode being disposed within the cylindrical housing and perpendicular relative to the threaded outer surface of the cylindrical housing, the elastically bendable electrode forming the bottom surface of the steel cylindrical housing positioned within the cylinder of the internal combustion engine when the cylindrical housing is mounted to the cylinder head of internal combustion engine;
an insulator structure insulating the stationary electrode from the cylindrical housing and defining a gap between the stationary electrode and the elastically bendable electrode; and
a circuitry configured to generate a signal based on a variable capacitance of the variable capacitor, the generated signal representing the pressure exerted on the bottom surface of the cylindrical housing.

2. The capacitive pressure sensor according to claim 1, wherein the stationary electrode is substantially parallel to the elastically bendable electrode.

3. The capacitive pressure sensor according to claim 1, further comprising a thermal insulating component disposed at least partially between the bottom surface and the circuitry.

4. The capacitive pressure sensor according to claim 1, wherein the elastically bendable electrode is elastically bendable at pressures exerted on the bottom surface below 20 bar.

5. The capacitive pressure sensor according to claim 1, wherein a thermal conductivity between the bottom surface and the circuitry is less than 3.5 W/(m*K).

6. The capacitive pressure sensor according to claim 1, wherein the stationary electrode is comprised of ceramic.

7. The capacitive pressure sensor according to claim 1, further comprising a first conductive structure electrically connected to the stationary electrode, and a second conductive structure electrically connected to the elastically bendable electrode.

8. A capacitive pressure sensor apparatus comprising:
a cylindrical housing including a side wall and a bottom wall, the cylindrical housing being mountable to a cylinder head of an internal combustion engine;
a variable capacitor having a stationary electrode and a movable electrode, the stationary electrode being disposed within the cylindrical housing and perpendicular relative to the side wall of the cylindrical housing, the movable electrode forming at least a part of the bottom wall of the cylindrical housing exposed to the pressure and a hot environment within the cylinder of the internal combustion engine when the cylindrical housing is mounted to the cylinder head of internal combustion engine, the movable electrode being responsive to pressure changes in the cylinder, the stationary electrode and the movable electrode forming a capacitor having a varying capacitance according to the pressure changes in the cylinder;
an insulator structure supporting the stationary electrode such that the stationary electrode is insulated from the cylindrical housing and a gap is defined between the stationary electrode and the movable electrode;
a circuitry disposed in an upper portion of the cylindrical housing generating a signal representing the varying capacitance; and
a layered insulator structure disposed between the bottom wall of the cylindrical housing and the circuitry.

9. The capacitive pressure sensor apparatus according to claim 8, wherein the stationary electrode is parallel to the movable electrode.

10. The capacitive pressure sensor apparatus according to claim 8, wherein the movable electrode is configured to be exposed to the cylinder of the combustion engine.

11. The capacitive pressure sensor apparatus according to claim 8, wherein the movable electrode is elastically bendable at pressures exerted on the bottom wall below 20 bar, 50 bar, 80 bar, 100 bar, 200 bar, 300 bar, or 400 bar.

12. The capacitive pressure sensor apparatus according to claim 8, wherein the stationary electrode is comprised of ceramic.

13. The capacitive pressure sensor apparatus according to claim 8, further comprising a first conductive structure electrically connected to the stationary electrode, and a second conductive structure electrically connected to the movable electrode.

14. A capacitive pressure sensor comprising:
a cylindrical housing configured to mount the capacitive pressure sensor to a cylinder head of an internal combustion engine to measure a pressure in a cylinder of the internal combustion engine, the cylindrical housing having a bottom wall with a bottom surface that is exposed to the pressure in the cylinder;
a variable capacitor having a stationary electrode and an elastically bendable electrode, the stationary electrode being disposed within the cylindrical housing, and the elastically bendable electrode being arranged to be bent in response to the pressure exerted on the bottom surface, thereby a variable capacitance of the variable capacitor is representative of the pressure exerted on the bottom surface of the cylindrical housing;
a circuitry disposed in upper portion of the cylindrical housing generating a signal representing the varying capacitance; and
a layered insulator structure disposed between the bottom wall of the cylindrical housing and the circuitry, wherein:
a bottom layer of the layered insulator structure is fixed with an adhesive on an inner surface of the bottom wall of the cylindrical housing;
the elastically bendable electrode is fixed on top of the bottom layer of the layered insulator structure;
the stationary electrode is disposed on top of a second layer of the layered insulator structure disposed on top of the bottom layer such that the stationary electrode is insulated from the cylindrical housing and a gap is defined between the stationary electrode and the elastically bendable electrode; and
a plurality of additional layers of the layered insulator structure are stacked on top of the second layer, the plurality of additional layers being configured to provide insulation between the stationary electrode and the circuitry disposed in upper portion of the cylindrical housing.

15. A capacitive pressure sensor comprising:
a cylindrical housing made of steel including: (i) a threaded outer surface configured to mount the capacitive pressure sensor to a cylinder head of an internal combustion engine for measuring a pressure in a cylinder of the internal combustion engine, and (ii) a bottom surface exposed to the pressure and a hot environment within the cylinder of the internal combustion engine when the cylindrical housing is mounted to the cylinder head of internal combustion engine;
a variable capacitor having a stationary electrode and an elastically bendable electrode, the stationary electrode being disposed within the cylindrical housing and perpendicular relative to the outer surface of the cylindrical housing, the elastically bendable electrode forming the bottom surface of the cylindrical housing made of steel and exposed to the pressure and a hot environment within the cylinder of the internal combustion engine when the cylindrical housing is mounted to the cylinder head of internal combustion engine, the variable capacitance of the variable capacitor being representative of a pressure exerted on the bottom surface; and
an insulator structure insulating the stationary electrode from the cylindrical housing and defining a gap between the stationary electrode and the elastically bendable electrode.

* * * * *